Figures 2, 3:
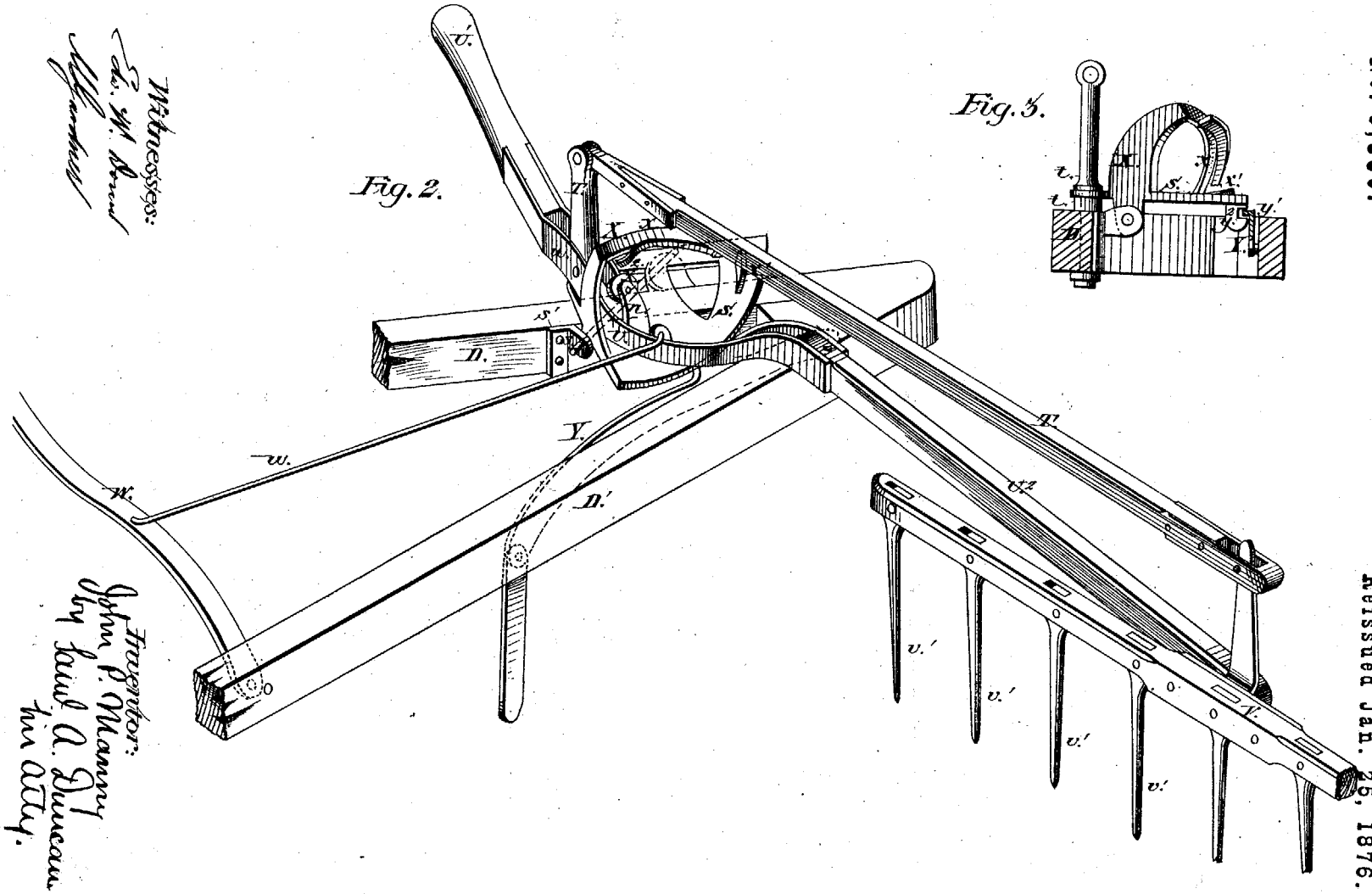

5 Sheets—Sheet 1.
J. P. MANNY.
HARVESTER.
No. 6,880.
Reissued Jan. 25, 1876.
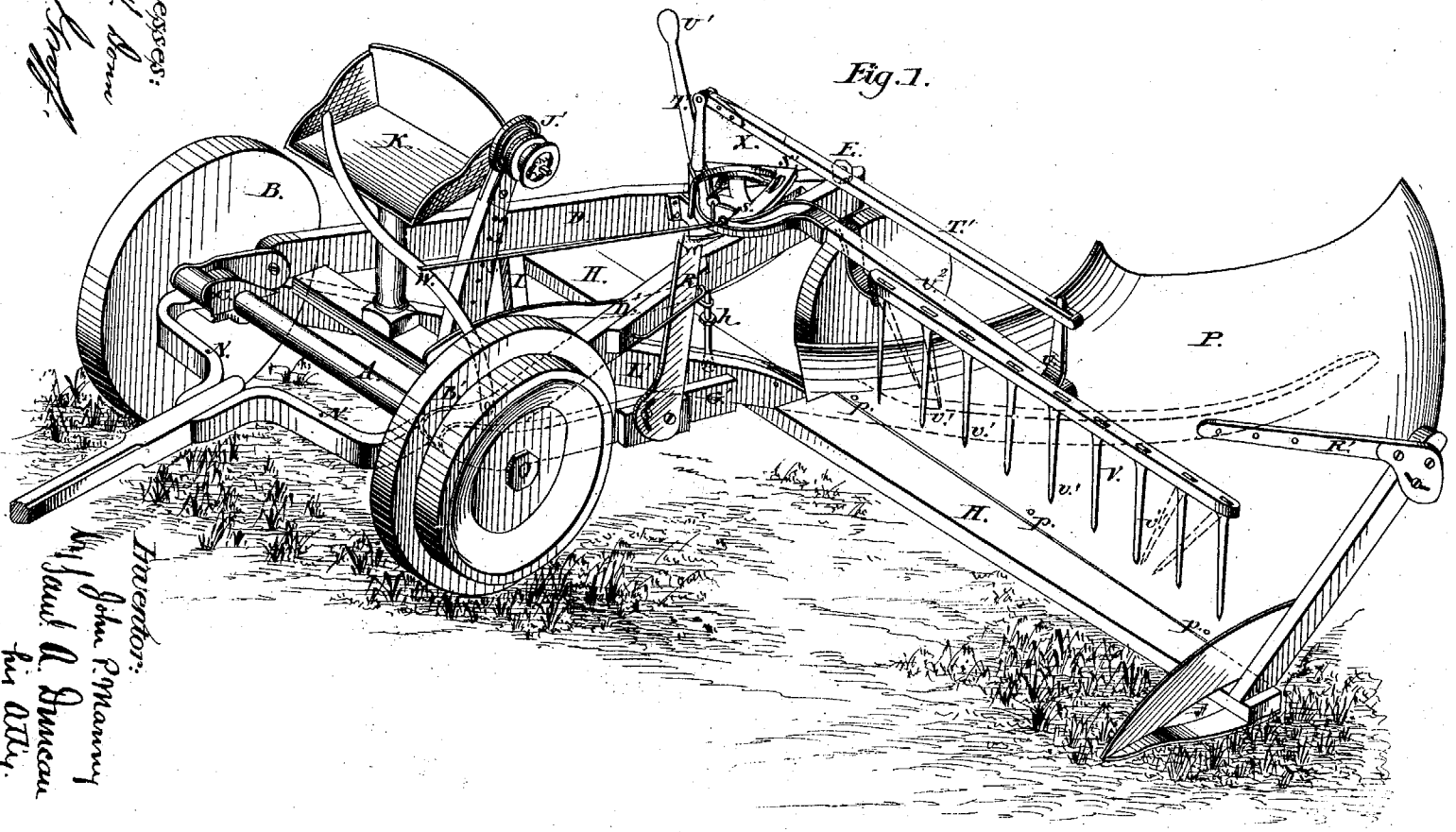
Witnesses:
Edw. W. Donn
F. B. Graff.
Inventor:
John P. Manny
by Saml. A. Duncan
his Atty.
N. PETERS, PHOTO-LITHOGRAPHER, WASHINGTON, D. C.

5 Sheets—Sheet 2.

J. P. MANNY.

HARVESTER.

No. 6,880.

Reissued Jan. 25, 1876.

Witnesses:
Ed. W. Bond
M Gardner

Inventor:
John P. Manny
by Saml. A. Duncan
his Atty.

N. PETERS, PHOTO-LITHOGRAPHER, WASHINGTON, D. C.

5 Sheets—Sheet 3.
J. P. MANNY.
HARVESTER.
No. 6,880.
Reissued Jan. 25, 1876.
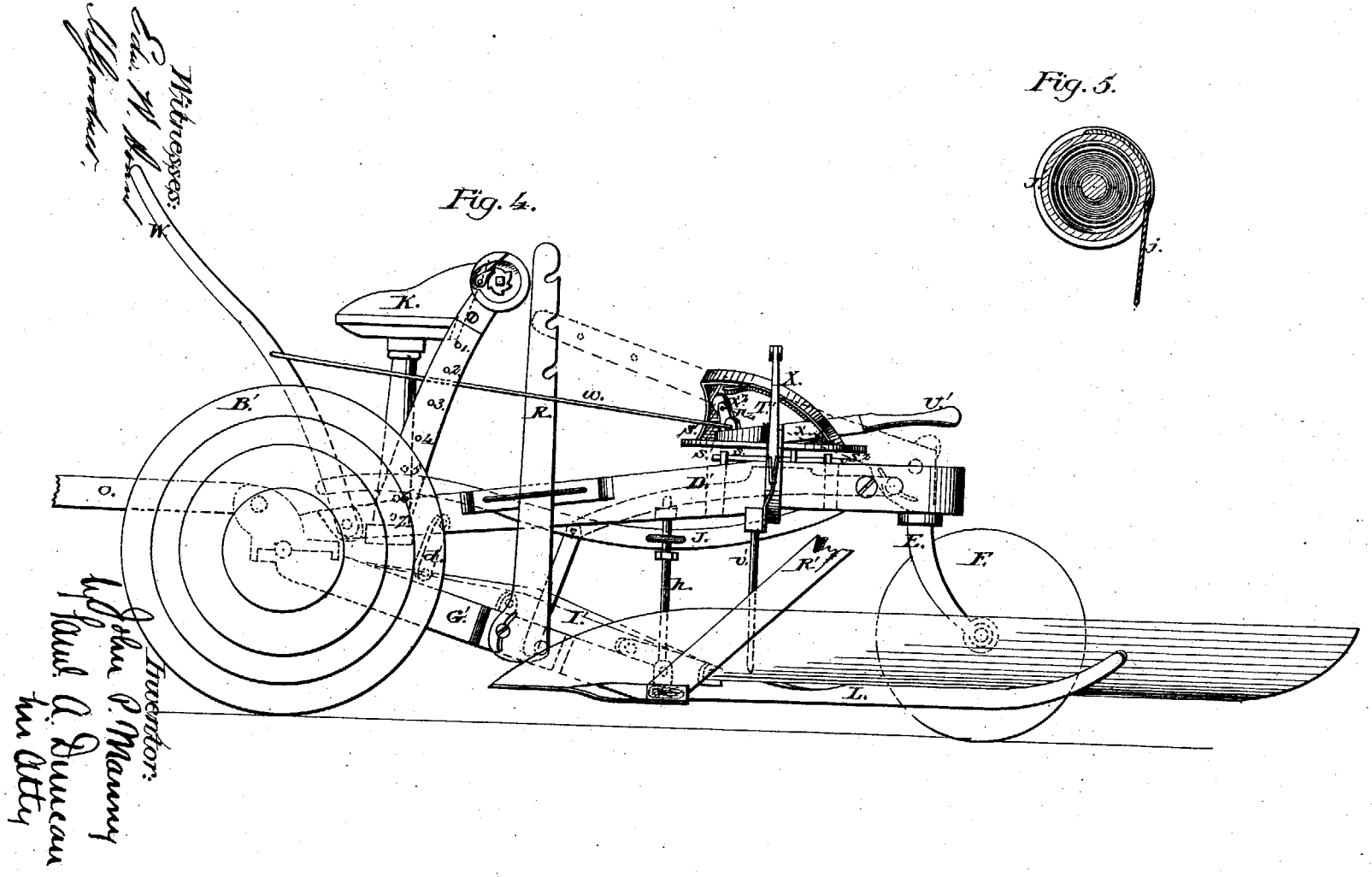
Witnesses:
Edw. W. Bond
M. Gardner.
Inventor:
John P. Manny
by Saml. A. Duncan
his Atty
N. PETERS, PHOTO-LITHOGRAPHER, WASHINGTON, D. C.

5 Sheets—Sheet 4.
J. P. MANNY.
HARVESTER.
No. 6,880.
Reissued Jan. 25, 1876.
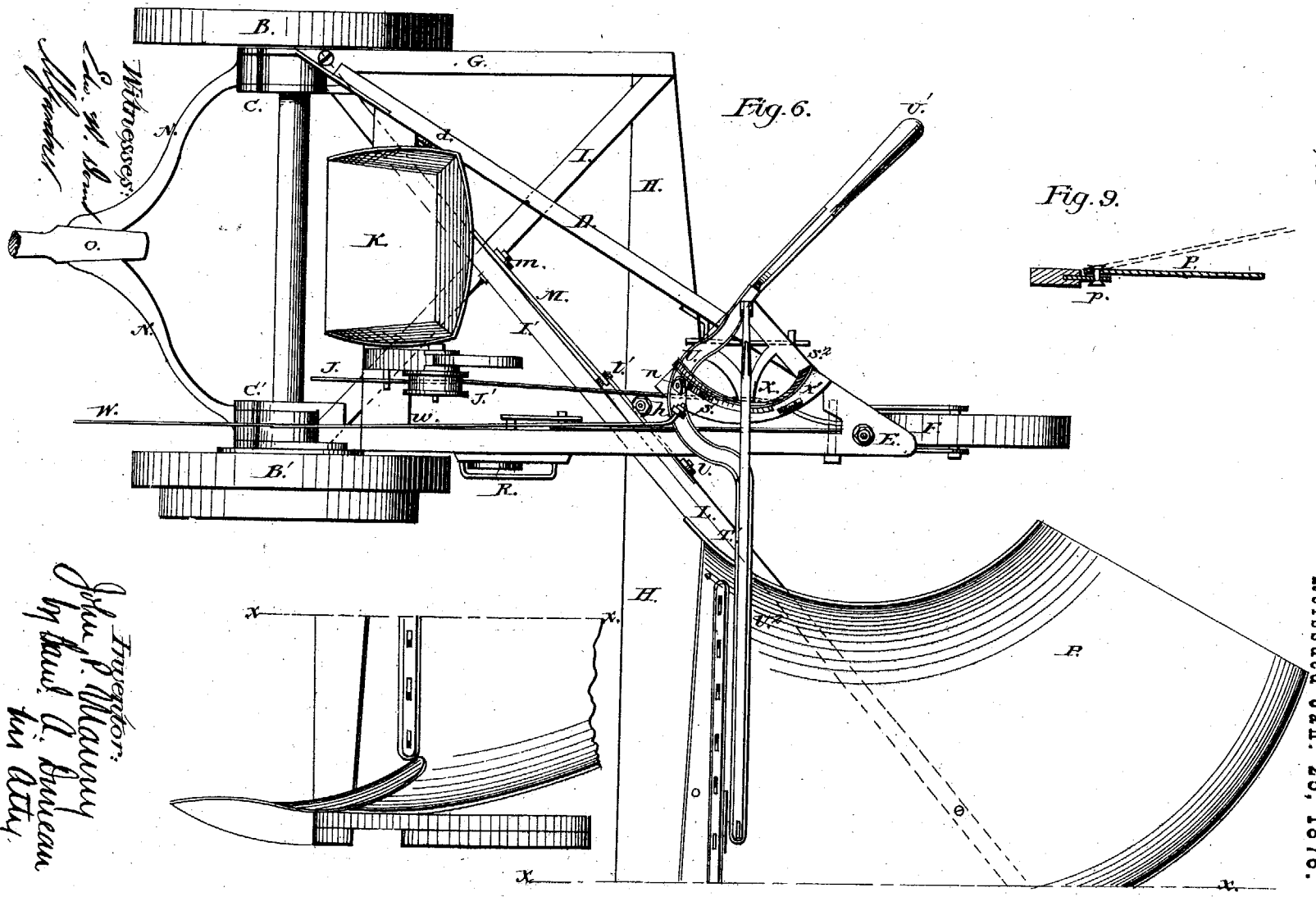
Witnesses:
Edw. W. Bond
M. Gardner
Inventor:
John P. Manny
by Chas. A. Duncan
his Atty.
N. PETERS, PHOTO-LITHOGRAPHER, WASHINGTON, D. C.

J. P. MANNY.
HARVESTER.

No. 6,880. Reissued Jan. 25, 1876.

Witnesses:
Edw. W. Bond
S. L. Gardner

Inventor:
John P. Manny
by Saml. A. Duncan
his Atty.

N. PETERS, PHOTO-LITHOGRAPHER, WASHINGTON, D. C.

UNITED STATES PATENT OFFICE.

JOHN P. MANNY, OF ROCKFORD, ILLINOIS.

IMPROVEMENT IN HARVESTERS.

Specification forming part of Letters Patent No. 17,798, dated July 14, 1857; reissue No. 3,580, dated August 3, 1869; reissue No. 6,880, dated January 25, 1876; application filed January 12, 1876.

DIVISION B.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The invention herein claimed relates to a harvesting-machine when used as a reaper, and to that particular class of machines in which the cutting apparatus projects laterally from the path of the team, and in which the cut grain is removed from the grain-platform, which is located immediately behind the finger-beam, by means of a rake sweeping over the platform in a curved path, so as to deposit the gavels upon the stubble out of the way of the team upon its next round.

In such machines the rake, while sweeping off the grain, should move nearly or quite in contact with the surface of the platform, and upon leaving the same should be raised up and carried forward to the front of the platform through an elevated path entirely above the cut and the falling grain. It is found in practice that this is best accomplished by so mounting the rake that it will move radially about two axes of motion, (one being its supporting standard or shaft, and the other or secondary axis being arranged transversely to its length,) and guiding its movements upon the two centers or axes of motion thus provided by means of a cam-guide.

Experience further shows that a cam-guide employed for this purpose should be located at the stubble side rather than at the grain side of the platform. When thus located there will be less liability of its becoming clogged with the cut grain, and it can be far more conveniently constructed to give the requisite elevation to the rake on its forward movement.

The object of the invention herein claimed is, in part, to provide, in a machine of the character indicated, efficient means for guiding the rake and holding it down to its work while removing the gavel from the platform, and to raise it entirely above the cut and the falling grain upon the platform on its return movement.

A further object of the invention is to provide a cam-guide so constructed and arranged that, while a practical and effective side delivery of the cut grain is secured, the driver may ride upon the machine. By thus mounting the driver upon the machine he can regulate both the cutting and the raking mechanism, lifting the former over obstructions when the machine is provided with proper appliances therefor, and operating the latter with greater or less frequency, according to the condition of the standing crop; also, when mounted upon the machine, he has far better control of the team, is less liable to become fatigued, and his weight greatly aids in balancing the machine.

In order that my invention as herein claimed may be fully understood, I have represented in the accompanying drawings, and will proceed to describe, the principal parts of a machine in which I have embodied it, the parts omitted from the drawings being such as are well understood by builders of harvesters, and the parts shown in the drawings, but not described in the specification, being either parts well known in the art or parts that form the subject-matter of other divisions, by reissue, of the patent (No. 17,798) granted me July 14, 1857.

Figure 8:
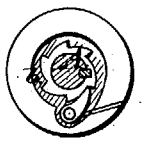
Figure 7:
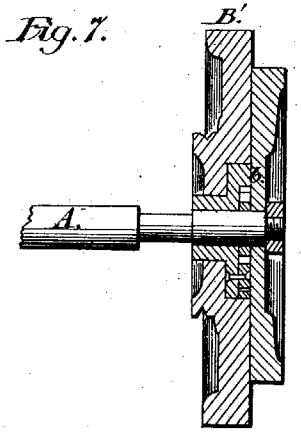
Figure 10:
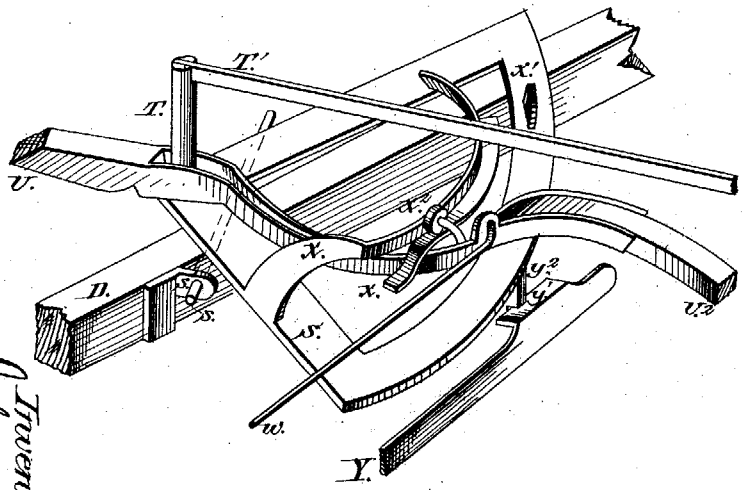

Figure 1 is a perspective view of the machine as seen from the divider side. Fig. 2 is a similar view, on an enlarged scale, of the raking mechanism. Fig. 3 is a view, in elevation, of the rake-supporting devices detached and seen from the front. Fig. 4 is a view, in elevation, of the machine as seen from the divider side. Fig. 5 is a vertical section through the lifting-drum. Fig. 6 is a plan or top view of the machine. Fig. 7 is a vertical transverse section through the inner driving-wheel. Fig. 8 represents one of the backing-ratchets. Fig. 9 is a vertical section through the platform on the line *x x* of Fig. 6. Fig. 10 is an enlarged perspective view of the cam-guide and its connected parts.

Referring to the parts which more particularly relate to the invention as herein claimed, D D′ is the frame of the machine, connected with the axle of the driving-wheels by the boxes C C′, and having the driver's seat K mounted upon it in a convenient position. H is the finger-beam projecting laterally from the path of the team. P is a grain-platform, located immediately behind the finger-beam, and curving inward toward the rear of the machine; and V is a rake supported on the radial arm $U^2$. This rake-arm, through the medium of the shank U, is attached to the post or shaft T, which constitutes an axis of rotation, around which it turns. It is also pivoted at *u* transversely to this axis of rotation, and to its own length; and by thus giving it motion around two transverse centers or axes, it follows that the rake may be caused to move forward or rearward, and to rise or to fall at pleasure.

Near the rake-post is placed a cam-guide, by means of which the vertical movements of the rake, while in operation, are controlled automatically. This cam-guide consists of a supporting-frame, S X, and a flange, rib, or ledge, *x*, projecting out from the face thereof. Only the upper part of this ledge is rigidly attached to the frame X, the lower part being left free to act as a spring, for a purpose hereinafter explained.

A principal office of this ledge or rib *x* is to control the path of the rake when it is moving forward to the front of the platform. It does this through the medium of a lug or stud, *n*, projecting from the shank that supports and carries the rake-arm. This stud is so constructed as to overhang the flange or rib *x*, which thus serves as a cam-track to lift the rake whenever the end of the stud rests upon the upper surface of the track.

In order to diminish friction, the end of the stud *n* is provided with a friction-roller, $x^2$.

The forward end of the cam-track is shown as slightly bent downward. This is to permit the rake-head to pass in under the reel-bats when the rake is operated in connection with a reel revolving around a horizontal axis.

As the rake descends from the cam-track *x* and moves rearward over the platform, it is prevented from falling into the cutters and from dragging too heavily upon the platform by means of the lower part S of the cam-frame, which supports the rake, and guides it in a plane substantially parallel with the platform. At the same time the rake is held down to its work by means of a stud or spur projecting from the rake-shank, which would strike against the under side of the flange *x* if the rake should begin to rise.

The twofold capacity of the cam-ledge *x*, whereby it not only raises the rake on its return movement, but also prevents its rising up when sweeping off the grain, is due to the fact that the ledge stands out, substantially, at right angles from the face of its supporting-frame, so that the short guide-arm *n*, attached to the rake-shank U, may act upon the side or face of such ledge or flange. In this respect the operation is different from that which results when a cam-ring is used, and the rake-arm acts directly upon the edge of such ring.

The rear and lower end of the cam-track *x*, as above stated, is not attached to the frame X. It thus operates as a spring switch or gate. As the rake moves rearward in delivering the gavel, the stud *n* pushes up this free end of the track *x*, which springs back into place again as soon as the stud has passed out from under it, from which it follows that when the rake begins its return movement the bent end of the stud *n* will mount the track *x*, and thus carry the rake up through an elevated path.

By an inspection of the drawings it will be seen that the raised part of the cam-guide forms an angle with that part which supports the rake in its horizontal movement. This angle should be large enough to carry the rake in its forward movement clear of the cut and falling grain. At the same time it should not be so large as to cause the rake to sweep around over the frame of the machine, and interfere with the driver riding on his seat. These conditions are made possible in a cam-guide located on the same side of the platform with the driver's seat by the employment of a short rake-arm.

In the Dorsey harvester, patented March 4, 1856, the rake-arm is extended out beyond the pivots on which it turns, and a beater is attached to the outer end of such extension. The result of this is, that both the rake and the beater sweep over the frame of the machine, as well as over the platform, and thus render it impossible for the conductor of the machine to ride.

In the present invention, on the contrary, the rake-arm proper is not extended beyond the rake-shaft or axis of rotation. It is, indeed, proposed, as an alternative mode of operating the rake, to insert a short handle, $U^1$, in the heel of the shank U, by means of which another person than the driver may, if desired, intermittently operate the rake; but this short handle would in no degree interfere with the driver's seat, nor would it in any way prevent the construction of the cam in such shape as to carry the rake clear of the driver's seat. This, moreover, is only an alternative mode of operating the rake. The preferred mode is by means of a lever, W, placed near the driver's seat, and connected with the shank of the rake-arm by means of the rod *w*. This lever enables the driver from his seat to control the frequency of the movements of the rake, according to the thickness or thinness of the crop.

It will be seen that the shank U is an important device. It serves as a support for the rake-arm, and also, by receiving the transverse pivot *u*, it becomes a hinge on which the rake may oscillate. It also forms a support for the lug or projection which co-operates with the cam ledge or track *x* to control the vertical movements of the rake. This use of a metal shank, U, for the purposes indicated permits the rake-arm, which is ordinarily made of wood, to be made much lighter than would otherwise be possible.

In addition to the parts above described, but not necessarily connected with them, there are various other features of construction in the machine illustrated in the accompanying drawings. The machine, for instance, has an adjustable lower frame connected with the main carrying-frame D D′ by a hinge-connection, so that the finger-beam, which is attached to such lower frame, may rise and fall with the undulations of the ground, and independently of the main frame, and so that it may also be lifted up by the driver by means of a lever, J, located near the driver's seat, either for the purpose of avoiding obstructions or of regulating the height of the cutters according to the condition of the crop.

The cam-guide, which controls the vertical movements of the rake, is shown as mounted on the main carrying-frame. In order that this guide may be vertically adjustable, so as to preserve the harmonious relation of the rake and the platform at the different elevations of the latter, it is pivoted to the frame by means of the rod or pin *s*, which rests in boxes $s^1$ $s^2$. The inner end of the guide is provided with a fork, which embraces the rake-standard T between the two fixed collars *t*.

As the rake-arm is pivoted horizontally at *u* to the standard T, which is free to turn upon its axis, and also to move up and down in its bearing, and as the rake-arm is further supported upon the upper face of the cam-guide, it follows that whenever the cam-guide is rocked upon the pin or shaft *s* the vertical position of the outer end of the rake-arm, and thus also the vertical position of the rake-head will be correspondingly changed. The cam-guide is caused to rock automatically upon its shaft by means of the lever Y, pivoted to the bar D′ of the carrying-frame, and the slotted stud $y^2$ upon the under side of the cam-guide. A horizontal flange, $y^1$, upon the lever Y takes loosely into the slot in the stud $y^2$, while the forward end of the lever Y is connected with the lower or adjustable frame of the machine by means of a pivoted rod or link.

Thus, whenever the finger-beam, to which the platform is attached, is raised or lowered, the cam-guide is automatically rocked upon its shaft, and the elevation of the rake, which is controlled by the cam-guide, is changed simultaneously, and to the same extent.

In order to insure the proper entry of the rake upon the platform, and movement over the same, the rake-shaft T is extended up above the transverse axis *u*, and this extension serves as a standard for supporting the device, by means of which the desired result is attained.

This device consists of a rod, T′, which is pivoted at one end to the extended rake-shaft, and at the other to the upright arm *v* of the rake-head, the rake-head, in turn, being pivoted to the outer end of the rake-arm.

From this construction it results that whatever the elevation of the platform, relatively to the plane of the driving-wheels, the rake will be brought into a horizontal position as it enters upon the platform, and will be supported in that position while sweeping off the grain.

The horizontality of the platform, during the vertical oscillations of the finger-beam, is maintained by means of a lever, L, and its connections. This lever is pivoted to the finger-beam at *l*, and is connected at its forward end, *l′*, with one end of a second lever, M, which is pivoted to one of the diagonal braces of the lower adjustable frame, and has its other end connected with the upper carrying-frame by means of the link *d*. As the lever L reaches under and is attached to the platform, and the platform is connected with the finger-beam by hinges, this construction causes the platform to turn slightly upon its hinges as the finger-beam rises and falls, and thus its horizontality is preserved.

In order that the finger-beam, the grain-platform, and the connected parts may be suspended from the carrying-frame, a suspension device, *h*, is provided, which is connected at its lower end with the finger-beam, and at its upper end with the carrying-frame; and in order that the same device, which is so attached to the finger-beam as to constitute a yielding or flexible connection, may be used to raise and lower the finger-beam and the parts connected therewith, its upper end is connected to the carrying-frame through the intervention of a lifting-lever, J. This lever is pivoted at its rear end to the carrying-frame, while its front end passes forward within reach of the driver on the seat K, so that he is enabled from his seat to raise and lower the finger-beam and the platform, and the other parts connected therewith.

The finger-beam and connected members may be temporarily secured at any particular elevation to which they may be raised by means of a standard arranged at the side of the driver's seat, and provided with a series of holes for the insertion of a retaining-pin under the lifting-lever, the front end of which traverses alongside the standard.

The effective length of the suspension device may be varied, if required, by means of the nut screwed upon its upper end above the eye upon the lifting-lever, through which it passes.

A second nut, arranged upon this suspension device below the lifting-lever, serves as a collar, against which the lever may be made to bear whenever the driver finds it necessary to press down upon the cutting apparatus to hold it to the ground.

Reel-supports R R′ are provided for holding the shaft of an ordinary gathering-reel, said shaft being driven by a pulley attached to the face of the driving-wheel B′. These supports are pivoted at their lower end, and are provided with slots and set-screws, so that they can be adjusted forward and backward, as occasion may require. Also, they are so connected with the finger-beam as to partake of its up-and-down movements, and thus the reel, the finger-beam, and the platform rise and fall simultaneously.

In the machine shown in the drawings, the grain-platform is not only curved to conform to the circular sweep of the rake, but it is contracted at its delivery side, so as to condense the gavel before it is discharged upon the stubble. The rake is also specially adapted for operation in connection with such a platform, by having the outer teeth pivoted so as to swing laterally in the plane of the rake-head, by which means the teeth are pressed toward each other by the converging sides of the platform as the rake moves toward the delivery side, but return again to their vertical position as the rake lifts up on its forward movement.

In order to prevent the rake from dragging or scattering the gavel when it is discharged upon the stubble, a sharp incline, $x^1$, is formed upon the lower track of the cam-guide at its rear end; the position of this incline in relation to the delivery side of the platform being such that the moment the gavel is lodged upon the stubble the rake-arm is brought in contact with the face of the incline, by which means the rake itself is thrown suddenly upward and entirely disengaged from the grain of the gavel.

The machine is drawn forward by means of the tongue O, which connects with the main frame of the machine by the hounds N N, pivoted to the boxes C C′.

The object of thus making a hinge-connection between the pole and the carrying-frame, which, by consequence, has to be provided with a caster-wheel support at the rear, is to relieve the horses' necks, so far as possible, from the shock and strain that are apt to occur when the carrying-frame and pole are rigidly connected.

It will be readily understood, however, that my invention in no wise relates to the mode in which these two parts are connected.

Various essential elements of a harvesting-machine, such as the cutters, the gearing, and other members, are not exhibited in the accompanying drawings, since the invention in no way relates to these omitted parts, and their construction is well understood by builders of this class of machines.

What is claimed as new is—

1. In a harvester provided with a driver's seat, the combination of a sweep-rake, moving radially on a secondary pivot, arranged transversely to its length, and a cam-guide for controlling its vertical movements, located at the same side of the platform as the driver's seat, the parts being constructed and arranged to operate relatively to each other substantially as described, so that the driver may ride on the machine while the rake is in action.

2. The cam-guide for controlling the vertical movements of the sweep-rake, located at the same side of the platform as the driver's seat, and composed of two parts, substantially as described, one of which guides the rake when sweeping the grain from the platform, while the other is set at such an angle with said first part that the rake on its forward movement will leave a clear space above the frame of the machine for the driver to ride.

3. A short rake-arm operating relatively to a driver's seat, and in connection with a cam-guide located at the same side of the platform as such seat, substantially as set forth.

4. In combination with a sweep-rake turning radially on a secondary pivot arranged transversely to its length, a cam-rib, flange, or ledge projecting out from the face of a supporting-frame, and curved to conform to the prescribed path of the rake in its passage, substantially as and for the purpose set forth.

5. In combination with a sweep-rake and its guiding-cam, the metallic shank U, which serves as a hinge and support, both, to the rake-arm, and which is provided with a stud, spur, or projection, substantially as and for the purpose set forth.

6. In combination with a sweep-rake, a cam-guide located at the same side of the platform as the rake-post, and having two tracks, with a switch for changing the rake from the one track to the other.

7. In combination with a sweep-rake, the extension of the rake-shaft beyond the transverse pivot on which the rake turns, substantially as and for the purpose specified.

8. In combination with the extended rake-shaft, a connecting-rod pivoted thereto, by means of which the horizontality of the rake-head, while entering upon and moving over the platform, may be maintained.

JOHN P. MANNY.

Witnesses:

THOMAS C. CONNOLLY,

SAML. A. DUNCAN.